Aug. 4, 1959 W. O. BROOKS 2,898,410

LIMITER AMPLIFIER SYSTEM

Filed June 22, 1953 4 Sheets-Sheet 1

INVENTOR:-
William O. Brooks

By Herbert E. Metcalf
His Patent Attorneys

INVENTOR:
William O. Brooks
By Herbert E. Metcalf
His Patent Attorneys

Aug. 4, 1959 W. O. BROOKS 2,898,410

LIMITER AMPLIFIER SYSTEM

Filed June 22, 1953 4 Sheets-Sheet 3

INVENTOR:
William O. Brooks

By Herbert E. Metcalf
His Patent Attorneys

INVENTOR:
William O. Brooks

By Herbert E. Metcalf
His Patent Attorneys

United States Patent Office 2,898,410

Patented Aug. 4, 1959

2,898,410

LIMITER AMPLIFIER SYSTEM

William O. Brooks, Hawthorne, Calif., assignor to Northrop Corporation, Hawthorne, Calif., a corporation of California Application June 22, 1953, Serial No. 363,185

6 Claims. (Cl. 179—171)

This invention relates to communication amplifier systems and more particularly to an audio peak limiting amplifier system for local and/or distant communication.

Limiter amplifiers are used in various types of communication systems to limit signal peaks due to voice and/or music to a maximum predetermined and preset output level that enter, for example, a transmitter, telephone line, sound recorder or back into a set of headphones worn either by a speaker or listener. The present, known commercial limiter amplifiers, in particular, are quite complicated, require many tubes, are costly and find use almost entirely in broadcast stations where the results are absolutely required and cost is a secondary consideration. Although the finest limiter amplifiers at present only approximate the desired results for an ideal limiter, they would still be useful in many different applications except for their prohibitive cost and the lack of simple circuits which would be flexible enough to apply to other audio devices.

It is an object of this invention to provide means for a new and useful audio peak limiting circuit.

It is another object of the invention to provide a limiter amplifier suitable for use as a local interphone amplifier as well as a line limiter.

Another object of the invention is to provide means suitable for limiting a diversified input to a recorder to eliminate manual monitoring.

Another object of this invention is to provide a low distortion and high fidelity line limiter.

And it is a further object of the invention to provide means suitable for inserting a tone into a limiter amplifier.

A still further object of the invention is to provide a limiter amplifier system suitable for local and distant communication, and recording thereof.

The foregoing and other objects are preferably accomplished by providing a peak limiting circuit having a controlled amplifier stage which is governed by a delayed D.C. bias voltage obtained by amplification and rectification of the input signal and feeding this voltage negatively back to appropriate points of the controlled amplifier. This peak limiting circuit is incorporated into an amplifier system wherein microphone input is provided, and headphone output receives the peak limited signals. Means for plugging in a recorder into the system is also provided as well as a tone oscillator for telephone system recording. A telephone line and other local lines are coupled into the limiter amplifier by means of a selector switch and transformer coupling. A push-pull version of the limiter amplifier provides a low distortion, high fidelity line limiter.

The invention will be more fully understood by reference to the accompanying drawings, in which.

Figure 1:
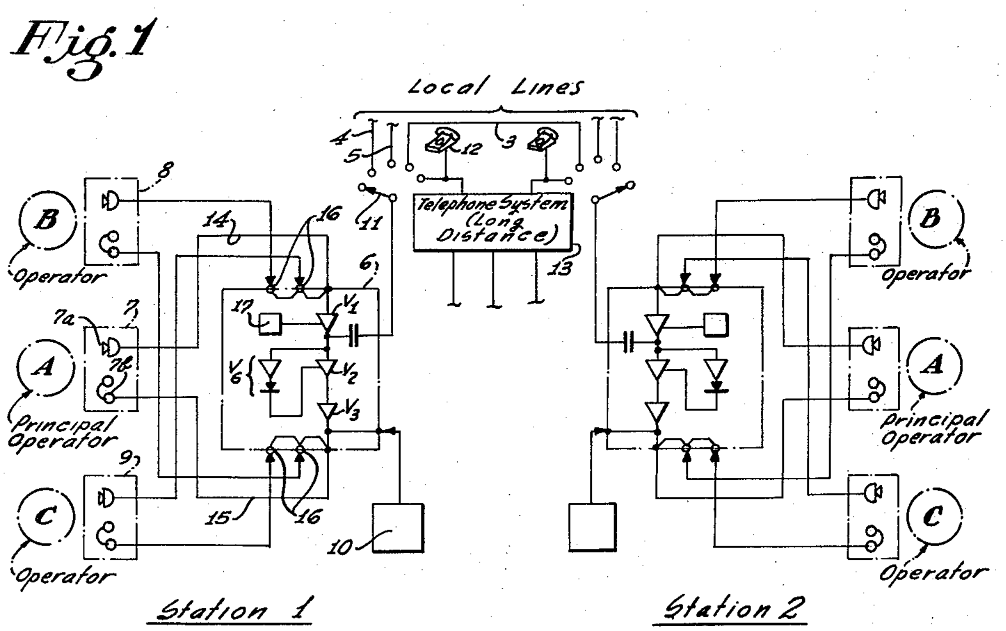
Figure 1 is a single-line schematic drawing of a preferred communication system utilizing limiter amplifiers of the present invention.

Referring first to Figure 1, there is shown a single-line schematic of a communication system utilizing limiter amplifiers of the present invention. Two stations are fully shown and are labeled as station 1 and station 2, respectively. These stations have been shown as being identical and can be separated by a distance of several miles. They can be connected directly together by a local line 3. There can be several other similar stations (not shown) which are located in a general area and all can be directly connected together by local lines such as 4 and 5, for example.

Station 1 comprises a limiter amplifier 6, a plurality of headsets 7, 8 and 9, for example, for the use of several operators, a recorder 10, selector switch 11 and a telephone instrument 12 which is connected to a commercial telephone system 13. Station 2 is preferably identical to station 1 and is symmetrically shown as such without additional identifying numerals.

The headset 7 consists of a microphone *7a* and a pair of headphones *7b*. This headset is worn by a principal operator A who generally would be located near limiter amplifier 6, controlling selector switch 11. Headset 7 can be permanently connected to limiter amplifier 6 by lines 14 and 15 when selector switch 11 is mounted on or near limiter amplifier 6, thus making a headset always available on calls.

A plurality of jacks 16, schematically indicated by small circles in Figure 1, are provided on limiter amplifier 6 so that other headsets such as 8 and 9 for the use of operators B and C, respectively, can also be plugged into the system. Having selector switch 11 placed in the first (left) position as shown in Figure 1 and with all headsets plugged in, this becomes a common interphone systyem for intercommunication between operators. The use of these headsets is necessary when the operators are remotely stationed from each other or when operations are carried on in a noisy room or area. It is noted that having switch 11 in this position disconnects any outside line from limiter amplifier 6 and intercommunication is achieved through a parallel connection of headsets to limiter amplifier 6.

Communication is made possible with another local station by adjusting selector switch 11 to connect with the local line for that station. Station 2 can be connected with station 1, for example, by moving the tap of selector switch 11 to the fourth position from the left in schematic Figure 1, thereby connecting with local line 3. Alarm to the other station, for the system shown, can be made over telephone system 13 giving notification of a call and the operator there stationed can accordingly move his selector switch to connect with the designated line. The local lines there shown are preferably used for extended periods of conversation and recording, the telephone line being generally reserved for long distance communication and inter-station alarm. An auxiliary alarm system (not shown) can be provided if a commercial telephone system is not employed, or not available. The limiting action of limiter amplifier 6 is particularly necessary when the local lines are approximately three miles long, or greater, since the incoming signals would be attenuated very noticeably over this distance in comparison with out going signals and a speaker must, therefore, speak strongly into a microphone for this distance in order to be heard clearly by a listener at the other end. Otherwise the gain of the amplifier must be increased measurably from normal setting. It is desirable that the outgoing signal also be fed back into a speaker's headphones and it is general practice to do so; hence either of the preceding alternatives would result in blasting the ears of the speaker without any limiting action.

A recorder 10 can be easily plugged into the system to record incoming and outgoing signals. By adjusting the gain of limiter amplifier 6 to sufficiently amplify the lowest signal level received, recorder 10 can be left unmonitored because the upper limit has been restricted to a certain desired maximum by the peak limiting circuit. Thus there is provided an automatic recording system wherein an operator is not required to continually observe a meter, manually increasing the gain when the signal level drops too low, or reducing it when the signal rises above a certain maximum for suitable recording.

It is not feasible to provide direct lines more than a few miles long connecting stations situated at distant points. For long distance, cross-country communication, commercial telephone system 13 can be utilized by placing switch 11 in the fifth (last) position. This couples limiter amplifier 6 across the telephone line connecting telephone instrument 12, which can be a standard dial telephone having a minor modification thereof consisting of paralleling the telephone lines to instrument 12 with the fifth position terminals of selector switch 11. In this way, use of this channel can be identical to ordinary telephone procedure except that input (and output) to the telephone is also carried through limiter amplifier 6 to one or a plurality of paralleled headsets and, if desired, to a recorder 10 which can record incoming and outgoing signals. A tone oscillator 17 which can put out a tone periodically into the line is provided for telephone system recording and other purposes.

Figure 2:
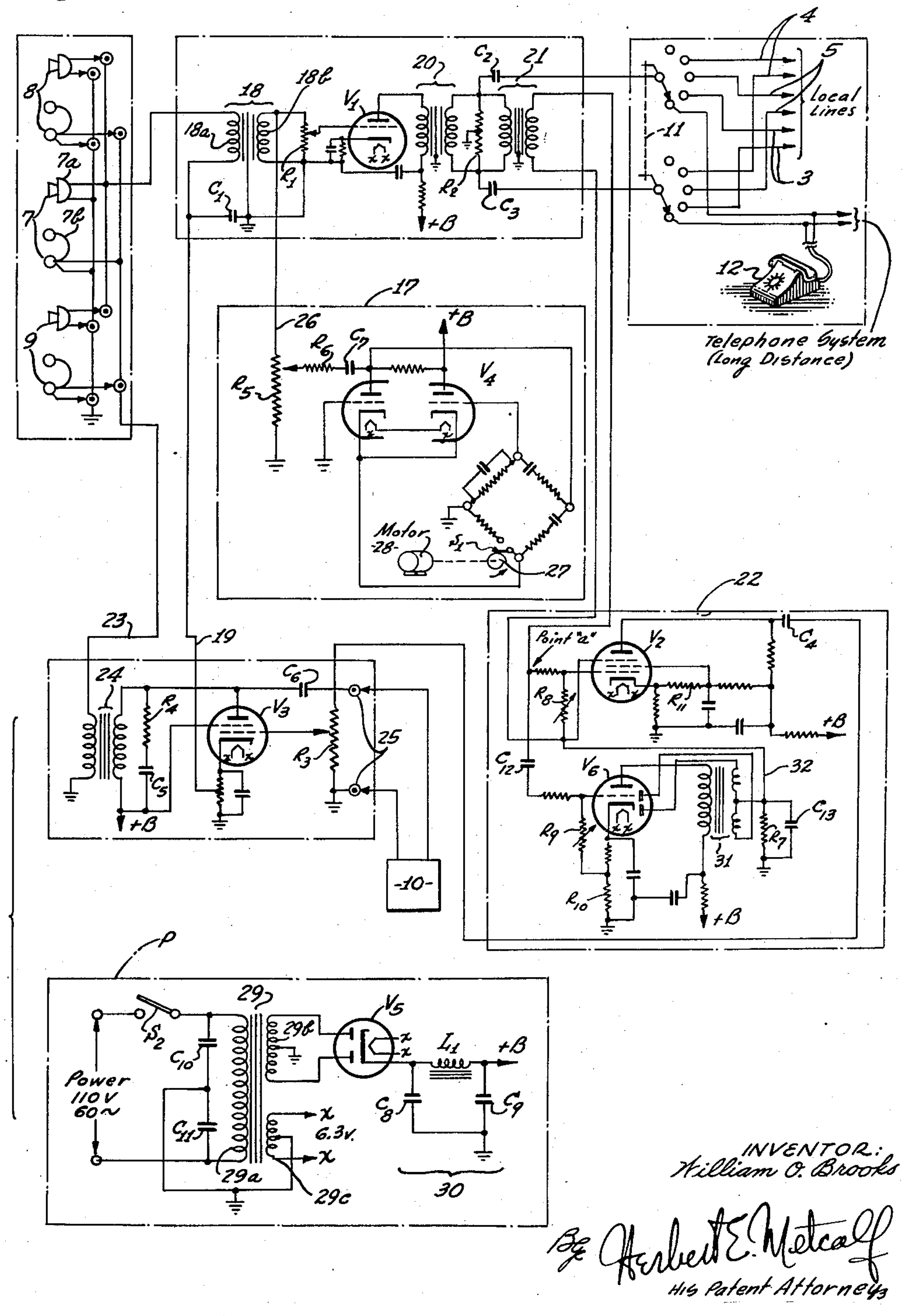
Figure 2 is a detailed wiring diagram of a preferred embodiment of a limiter amplifier.

Figure 2 is a schematic wiring diagram of limiter amplifier 6 showing in detail a preferred embodiment of the device. The headsets 7, 8 and 9, and selector switch 11 have also been fully shown in this figure for clarity and completeness of description.

Speech made into microphone **7*a*, for example, produces a signal in the primary winding 18*a* of transformer 18. This signal is transformed and appears across secondary winding 18*b* and resistance $R_1$, which is connected across secondary winding 18*b*. The microphones shown can be of the carbon type which normally require a polarizing current of from 5 to 20 ma. to operate. Lead 19 is therefore connected at, for example, a 6 volt tap to provide this current. $C_1$ is a bypass, filter capacitance connecting lead 19** to ground.

An adjustable tap connecting with the control grid of send amplifier tube $V_1$ can be located to a point on resistance $R_1$ such that the proper output voltage (0 volume unit level, for example) is secured at selector switch 11. The output of tube $V_1$ is transformer coupled by transformer 20 through D.C. blocking capacitors $C_2$ and $C_3$ to selector switch 11, which is actually a two pole, multiple position switch as shown. Transformer 21, which is connected back-to-back with transformer 20, is the input to audio peak limiting circuit 22. A resistance $R_2$ is connected across the back-to-back windings of transformers 20 and 21 to provide a center tap to ground, to reduce noise. While transformers can be provided wherein coil center taps are available, they are generally more expensive and have not been used in this example.

The output voltage secured at selector switch 11 can be adjusted by resistance $R_1$ such that the average level of outgoing voltage is 1.228 volts on a 600 ohm line (0 volume unit level), for example. Measurements made on a standard telephone line have shown that the ratio of average levels between outgoing signal voltage and incoming voltage from a remote point was approximately 30 to 1. This means that actually less than .05 volt comes in as compared to 1.228 volts going out on the line. In order to bring the incoming level up to adequate headphone volume and to restrain the outgoing signal, which is also fed back to the headphones **7*b* by the back-to-back transformers 20 and 21 arrangement, from overloading and distorting the headphones, a controlled receive amplifier stage $V_2$ is provided in the peak limiting circuit 22. This limiting circuit 22** will be more fully described later.

The output of controlled receive amplifier stage $V_2$ is coupled by capacitor $C_4$ to resistance $R_3$. The control grid of output amplifier tube $V_3$ can be adjusted to a point on resistance $R_3$ to set the volume at the headphones produced by the output appearing on line 23 from transformer 24. The headphones present an inductive type load which tend to accentuate the higher frequencies. In order to flatten out the headphone response at the higher frequencies, series resistance $R_4$ and capacitance $C_5$ are connected across the primary winding of transformer 24. The reactance of $C_5$ is chosen to equal the resistance of $R_4$ at 1000 cycles, for example, thus setting the point of inflection above which the response is lowered. The output of $V_3$ is also coupled by capacitor $C_6$ to a recorder 10 which can be plugged into jack 25 provided for this purpose.

A resistance-capacitance bridge feedback oscillator 17 can be used to insert a periodic tone into the system by causing a tone signal to be applied across resistance $R_1$ through lead 26 connected from resistance $R_5$, which is provided with an adjustable tap to regulate the output level of tone oscillator 17. An isolating resistance $R_6$ and a D.C. blocking capacitor $C_7$ are provided in the output lead of oscillator tube $V_4$. The frequency at which a tone is periodically produced in the system is determined by the frequency of rotation of cam 27 which is driven by motor 28. Switch $S_1$ is momentarily closed and opened once for each revolution of cam 27, causing tone oscillator 17 to oscillate at a frequency dependent upon bridge component values, for example 1000 cycles, and this signal is supplied to lead 26 periodically at the cam rotation frequency.

A power supply P controlled by switch $S_2$, provides the necessary voltages for limiter amplifier 6 from a 110 volt, 60 cycle source. A transformer 29 having a primary **29*a* and two secondary windings 29*b* and 29*c* steps up the 110 volts to 500 volts across center-tapped secondary winding 29*b*. Half of this output (250 volts) is fully rectified by full wave rectifier $V_5$ and smoothed by filter 30 consisting of a choke $L_1$ and parallel capacitors $C_8$ and $C_9$. Secondary winding 29*c* provides 6.3 volts filament voltage for the tubes. Capacitors $C_{10}$ and $C_{11}$ connected in series across primary winding 29*a*** and grounded at their common junction point comprise a "hash" filter. An electrostatically shielded transformer would negate this need and may be used instead.

Figure 3:
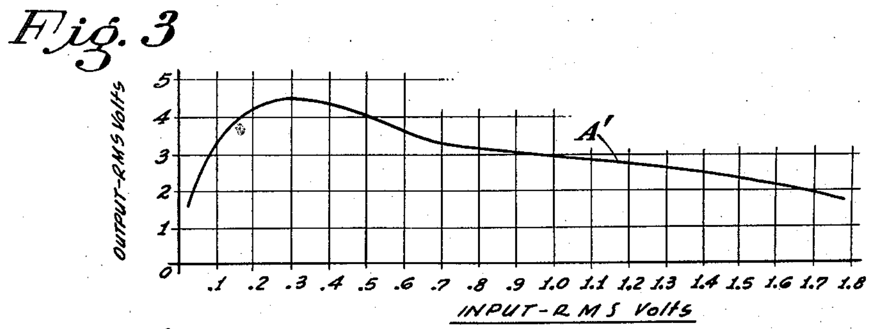
Figure 3 is a graph relating input and output performance of the preferred limiter amplifier.

Peak limiting circuit 22 prevents outgoing signals from overloading and distorting the local headphones and makes these signals sound equal in level to the weak, incoming signals from a remote point. Performance is illustrated in Figure 3, which is a graph of peak limiting circuit output (actually amplifier $V_3$ output) plotted against an input voltage variation of .05 to 1.8 volts appearing at selector switch 11 (curve A'). Limiting begins at about .1 volt so that weak signals are not cut down and the output (input to the headphones) is observed to vary no more than ±3 db from limiting point level over the working range of .1 to 1.5 input volts. This variation is just noticeable but is considered very good performance for equipment of this nature.

Figure 4:
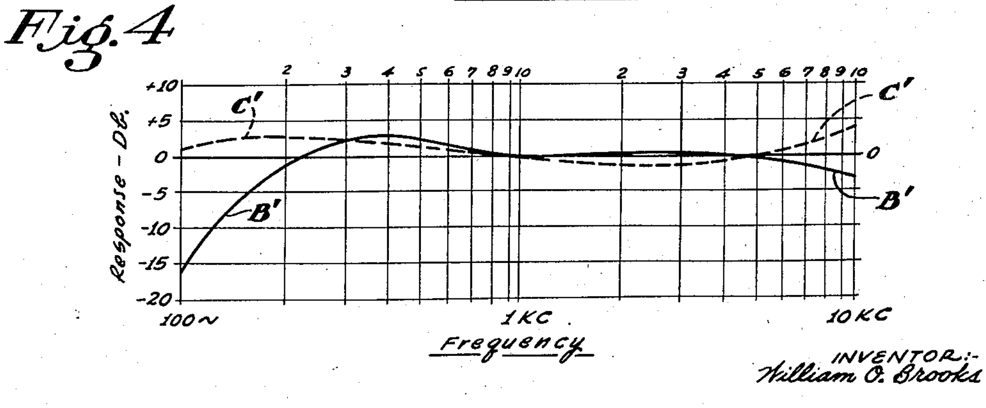
Figure 4 is a graph illustrating the frequency response of the preferred limiter amplifier.

The frequency response of limiter amplifier 6 is charted in Figure 4. Actually, the frequency characteristics of send amplifier stage $V_1$, have not been plotted since the send amplifier stage ($V_1$) is well within the standard requirements for voice communication of ±2 db from 200 to 400 cycles. With adequate coupling capacitors $C_2$ and $C_3$ into the line, the frequency response of send amplifier $V_1$ is constant within ±1 db from 100 to 10,000 cycles. In Figure 4, two curves have been shown, curve B′ relating to frequency response below the limiting point with a .05 volt input from the telephone line (selector switch 11) and curve C′ is the response above the limiting point with .77 volt (0 db) input from the line. This performance is adequately within standard requirements, being within ±1.5 db from 100 to 6000 cycles as is shown in Figure 4. Hum was measured at −60 db across a 500 ohm resistance.

Peak limiting circuit 22 comprises a remote cutoff pentode tube $V_2$, for example, as the controlled amplifier stage. This controlled tube can be a 6BA6, 6SK7, 5749 etc., for example. The gain of this tube is controlled by a negative D.C. voltage fed to the suppressor and the control grid return of $V_2$. This D.C. voltage is obtained by amplifying and rectifying the signal at point *a* by means of tube $V_6$ which is a combination triode and twin diode, for example. The input signal is coupled by capacitance $C_{12}$ to the grid of the triode section of $V_6$ and is amplified thereby. This output is applied to the primary of transformer 31, the secondary of which is connected across the plates of the diode section of $V_6$ rectifying the signal. A lead 32 connecting the center point of the secondary provides a negative D.C. bias voltage (because of $R_7$) to the suppressor and grid return of controlled amplifier $V_2$. Connected at the center point of the secondary of transformer 31 is a time constant resistance $R_7$ in parallel with a capacitance $C_{13}$ and grounded as shown. The low values of D.C. resistance of the secondary of transformer 31 and the diode resistance while conducting control the charging or attack time required to operate (rise time before limiting action takes place) and is .05 second, for this example. A long release (fall) time (.5 second, for example) also occurs at the discharging rate of $R_7$ and $C_{13}$ so that signals do not sound choppy.

A remote cutoff tube herein used for example requires from 0 to −50 D.C. volts to control it before cutoff is reached. To keep on the linear part of the control curve, −35 volts can be considered a maximum for an undistorted output. The bias voltages required to exactly hold the output constant within this range for a continuously variable input can be secured by the adjustment of four resistances in any form of this circuit. The first two are shunt resistances $R_8$ and $R_9$ in the L pad of the grid circuit of the controlled tube $V_2$ and bias amplifier section of tube $V_6$ respectively. These resistances provide the proper proportion of input signal to each tube. They have been shown as adjustable resistances but are normally replaced by fixed resistors after their correct values are determined. A third resistances $R_{10}$ is a delayed bias resistor and can be chosen in value, after the point is chosen in input voltage above which a flat output is desired, to cause bias to increase at the right input level and give a flat output beginning from this predetermined point. Finally, in some applications of this limiting circuit, an additional resistance $R_{11}$ can be used connected from screen to cathode of the controlled tube $V_2$ on the order of .5 meg., for example, to adjust the linearity of the output curve precisely. The action of this resistance $R_{11}$ is to hold the screen potential fixed with respect to cathode. These are rather easy adjustments and once set, can remain fixed.

An expander or compressor circuit may appear similar to peak limiting circuit 22. However, in present expander circuits, a positive bias voltage causes a controlled tube to amplify at a constantly increasing rate of output for a linearly increasing input voltage, starting with the smallest voltages, as exemplified by curve D in Figure 5. In a compressor circuit, a negative voltage makes a controlled tube amplify at a constantly decreasing rate of output for a linearly increasing input voltage as illustrated by curve E in the same figure. A linear (no control bias circuit) reference curve F has been included for comparison.

Figure 5:
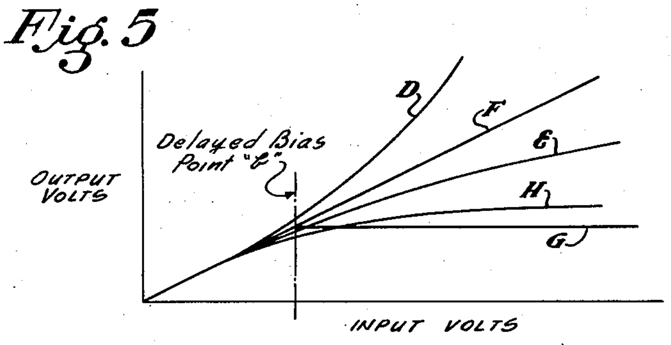
Figure 5 is a graph illustrating performance of the present peak limiting circuit in comparison with prior limiter amplifiers and other similar devices.

Older limiter amplifiers based upon the A.V.C. principle also follow curve E of Figure 5 wherein the gain is constantly decreasing (with respect to linear reference curve F) for a linearly increasing input voltage. These devices derive their bias control voltage from the output of the controlled tube. The ideal characteristic for a limiter amplifier (and automatic volume control system) is one in which the output is linear up to a certain input signal strength and becomes flat immediately above this limiting point as given by curve G. The finest limiter amplifiers at present approach the performance of curve G; however, they start lowering the output to some extent at weaker signals. This can be observed by noting the curvature of curve H for exceptionally good limiter amplifiers near the delayed bias point *b* of curve G. Curve G is very nearly the characteristic for a high fidelity peak limiting circuit of the present invention which will now be described.

Figure 6:
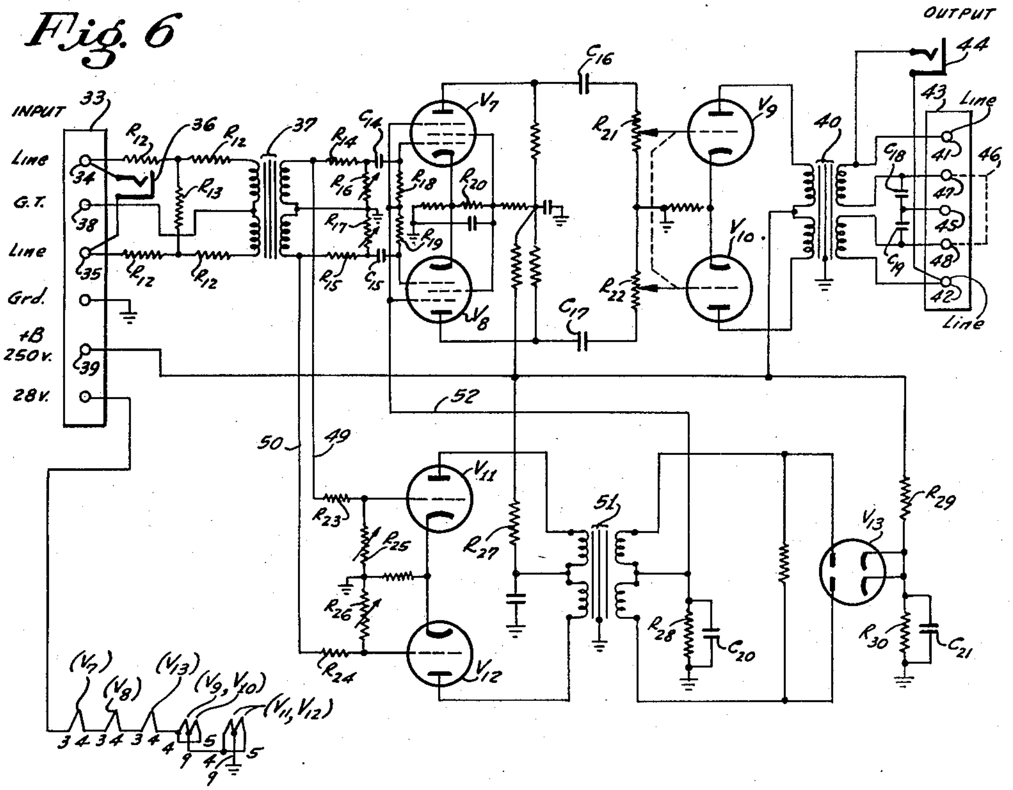
Figure 6 is a wiring diagram of a low distortion and high fidelity limiter amplifier.

Referring now to Figure 6, a limiter amplifier circuit of low distortion and high fidelity response, particularly suited for monitoring a sound recorder by having the many varying amplitudes of signal be recorded at a reasonably equal amplitude, is shown. This circuit is also particularly applicable as a broadcast station limiter which permits closer adjustments to 100% modulation at a transmitter. The gain of the limiter amplifier there shown, for example, is only two, but since it is designed to feed a self contained recorder, or the like, the gain need only be unity. This circuit can properly be called a line limiter amplifier. A balanced, push-pull version peak limiting circuit which corresponds to limiting circuit 22 of Figure 2 which includes output amplifier stage $V_3$ is illustrated in this Figure 6. This is a flexible piece of equipment built to operate from a central power source and one which can easily fit in a standard panel space, for example, 3.5 x 19 inches. It can be patched into a recorder circuit or any other circuit into which it is desired to limit the input. A power supply could be built as an integral part of the limiter amplifier although the one illustrated preferably operates from an external, central power source since it can be panel mounted.

Input terminal strip 33 has several terminals for connecting external wiring to the line limiter. Terminals 34 and 35 connect with two incoming lines wherein limiting is desired. A jack 36 is also provided across these terminals. Five resistances, four of them, $R_{12}$ of equal value and one, $R_{13}$ of different value comprise a parallel H pad (500 ohm for example) for cutting signal strength a certain amount to prevent overload in this particular line limiter and can be omitted for lower input signal levels. This H pad precedes input transformer 37 which has a primary center tap brought out to terminal 38 and its secondary center tap grounded. Immediately following transformer 37 is a balanced L pad comprised of four resistances $R_{14}=R_{15}$ and $R_{16}=R_{17}$ (shown adjustable) coupling with the grids of controlled amplifier tubes $V_7$ and $V_8$ through capacitances $C_{14}$ and $C_{15}$, respectively. Tubes $V_7$ and $V_8$ correspond to tube $V_2$ of Figure 2. Resistances $R_{18}$ and $R_{19}$ are grid return resistances for $V_7$ and $V_8$ and correspond to resistance $R_8$ (Figure 2). Resistance $R_{20}$ connecting the screen grids and cathodes of tubes $V_7$ and $V_8$ is provided to adjust the linearity of the output curve and corresponds to resistance $R_{11}$ for Figure 2.

The outputs of controlled amplifier tubes $V_7$ and $V_8$ are coupled by two equal capacitances $C_{16}$ and $C_{17}$ to dual potentiometers $R_{21}$ and $R_{22}$, the taps of which are respectively connected to the control grids of output amplifier tubes $V_9$ and $V_{10}$, which correspond to output tube $V_3$ in Figure 2. These taps are preferably adjusted by a slotted shaft which can be fixed in a given position by a locknut. They are generally set such that the output is at 0 volume unit (1.228 volts at 600 ohms). The primary winding (center connected to B+ voltage provided at terminal 39) of output transformer 40 is connected to the plates of output tubes $V_9$ and $V_{10}$ and the secondary is connected across terminals 41 and 42 of terminal strip 43 for an output. A jack 44 is also connected between terminals 41 and 42. D.C. blocking capacitors $C_{18}$ and $C_{19}$ are connected in series between two halves of the secondary winding, and the junction of these capacitors tied to a terminal 45, for an effective center tap. A jumper 46 can be connected between terminals 47 and 48 which are connected to the capacitor outer ends to shunt capacitors $C_{18}$ and $C_{19}$ if direct current is not used on the output lines. The entire line limiter can also be shunted out by connecting a lead directly between jack 36 and jack 44, if desired.

The input signal from transformer 37 is also applied to the grids of triodes $V_{11}$ and $V_{12}$ by leads 49 and 50 through a resistance network composed of four resistances $R_{23}=R_{24}$ and $R_{25}=R_{26}$ wherein $R_{25}$ and $R_{26}$ (shown adjustable) correspond to shunt resistance $R_9$ in Figure 2. This resistance network can be omitted in the present example line limiter if it includes a parallel H pad before the input transformer 37, since the parallel H pad can be made to incorporate the function of the resistance network, if desired. The amplified output of these tubes $V_{11}$ and $V_{12}$ is transformer coupled by transformer 51 to a twin diode $V_{13}$, the plates of which are connected across the secondary for full wave rectification thereof. The center tap of the primary winding of transformer 51 is connected to B+ through resistance $R_{27}$ and the secondary center tap is connected back to the suppressors and grid returns of tubes $V_7$ and $V_8$ by lead 52 which provides a negative D.C. bias control voltage. The secondary winding center tap is also connected to ground through a parallel resistance $R_{28}$ and capacitance $C_{20}$ combination. This network together with transformer and diode changing circuit determines the attack time required (.05 second, for example) to operate, while the discharge time of the $R_{28}$ and $C_{20}$ combination determines the release time.

The cathodes of twin diode $V_{13}$ are connected together to B+ through resistance $R_{29}$ and to ground by resistance $R_{30}$ and bypass capacitor $C_{21}$. Resistance $R_{30}$ is the delayed bias resistor whose value can set the limiting point above which the output remains flat thereafter. This resistance corresponds to resistance $R_{10}$ in Figure 2.

The line limiter can eliminate "riding gain" in recording, for example, and permit higher average levels on a line. It can therefore permit closer adjustments to 100% modulation at a transmitter, for example, since the average level can now be raised by limiting the strong peaks. The invention is desirable wherever there exist signals on the same line which carry widely varying signal levels.

Figure 7:
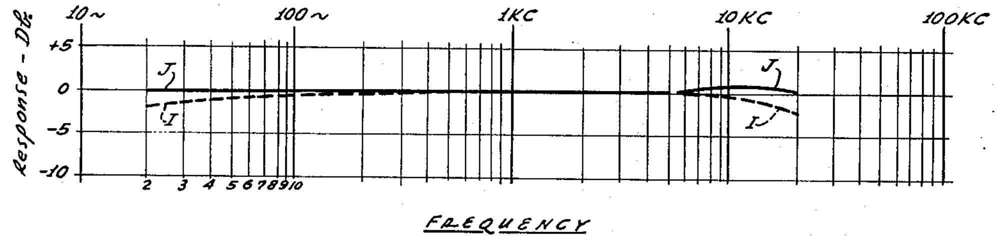
Figure 7 is a chart showing a plot of the frequency response for the high fidelity limiter amplifier.
Figure 8:
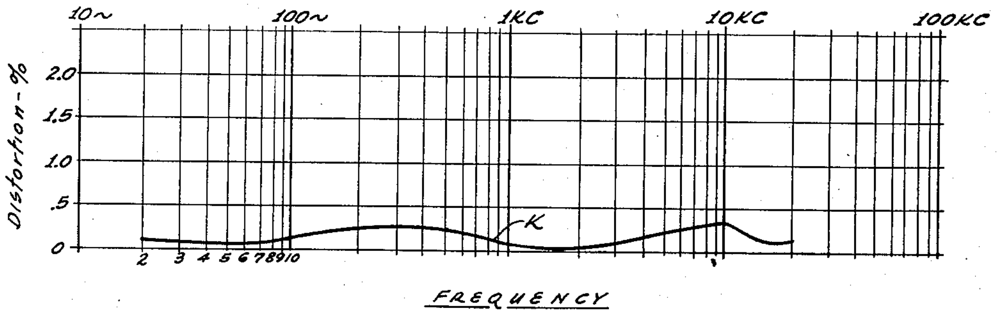
Figure 8 is a chart illustrating the low distortion characteristics of this limiter amplifier.
Figure 9:
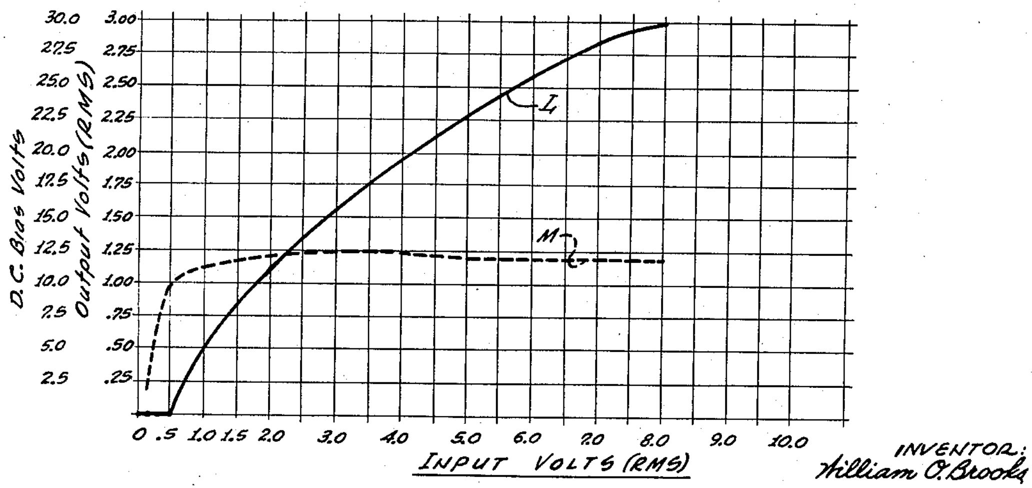
Figure 9 is a chart of performance for the high fidelity limiter amplifier.

Performance graphs of the line limiter are shown in Figures 7, 8 and 9. The frequency characteristics are shown in Figures 7 and 8 for frequency response and distortion, respectively. Two curves are plotted in Figure 7, curve I for response below the limiting point (delayed bias point) and curve J for response above the limiting point. Frequency response is within ±1.5 db from 20 to 20,000 cycles under non-limiting conditions and within ±.25 db from 20 to 20,000 cycles under limiting conditions. In Figure 8, percent distortion is plotted as a function of frequency for 0 volume unit output (curve K). The distortion of an external oscillator connected to the amplifier for the purpose of distortion measurements was subtracted from the total distortion to produce curve K (true amplifier distortion alone). Distortion is an average of .1% for the example shown. Hum has been determined at −60 db across 500 ohms.

There are also two curves shown in Figure 9. Curve L is a plot of input signal versus D.C. bias control voltages to the controlled amplifier. The delayed bias point is at .5 volt (input). Curve M relates input and output voltage on an R.M.S. basis. Output voltage is seen to remain flat within 1 db over an input voltage fluctuation of .5 to 8 volts R.M.S., which is the limiting range.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is, therefore, claimed in any of its forms or modifications within the legitimate and valid scope of the appended claims.

What is claimed is:

1. Means for limiting signal peaks in a line to a predetermined maximum average output amplitude comprising a controlled amplifier tube with associated plate-to-cathode circuit and D.C. operating voltage applied thereto, an input circuit connected to a control grid of said controlled amplifier tube, said input circuit connecting with said line to couple the unlimited line signal into said controlled amplifier tube, an output circuit connected to the plate of said controlled amplifier tube, a control tube with associated plate-to-cathode circuit and D.C. operating voltage applied thereto, said input circuit further connected to a control grid of said control tube to couple the same line signal into said control tube, a transformer with its primary winding connected in the plate-to-cathode circuit of said control tube, rectifying means having an anode and a cathode, said anode connected to one end of the transformer secondary winding, a load resistance connected between the other end of said secondary winding and a point of zero reference potential, means connecting said cathode of said rectifying means to said zero reference potential point, and means effectively connecting the junction of said load resistance and said secondary winding to said grid of said controlled amplifier tube to apply a negative bias voltage to said controlled amplifier tube which is proportional to the amplitude of said unlimited line signal above a threshold value, whereby the controlled amplifier tube output signals are limited to said predetermined maximum.

2. Limiter amplifier control means comprising signal coupling means having an input adapted to receive an incoming signal to be limited and an output adapted to be connected across the input grid resistance of a limiter amplifier to be controlled, to apply said incoming signal thereto, a control tube, means connecting said input to a grid of said control tube to apply said incoming signal, unchanged, to said control tube also, a transformer having a primary and a center-tapped secondary, and a full wave rectifier diode, the primary of said transformer connected across the plate circuit output of said control tube, and said secondary connected across the plates of said diode, said transformer secondary center tap connected to a load to produce a negative D.C. bias potential across said load increasing with incoming signal strength, the other end of said load connected to a zero-potential point, means connecting the cathode of said rectifier diode to the same zero-potential point, and said center tap also directly connected to said output of said signal coupling means to apply said bias potential to the limiter amplifier to regulate the gain thereof inversely with incoming signal strength.

3. Apparatus in accordance with claim 2 wherein said means connecting the cathode of said rectifier diode to said zero-potential point includes a delayed bias resistance for delaying rise of said bias potential until said incoming signal rises above a predetermined level.

4. Limiter amplifier control means comprising signal coupling means having a double-ended input adapted to receive an incoming push-pull signal and a double-ended output adapted to be connected to a dual control grid circuit of a push-pull limiter amplifier to be controlled, a balanced pair of control tubes, means connecting said double-ended input in opposite polarity fashion to the respective grids of said control tubes, a transformer having a center-tapped primary and secondary, and a full wave rectifier diode, said primary connected across said control tube plates and said primary center tap adapted to be connected to a positive supply voltage source, said secondary connected across the plates of said diode, means connecting the cathodes of said diode to the negative side of said voltage source, and said secondary center tap connected to a load to produce a negative D.C. bias potential across said load increasing with incoming signal strength, and said secondary center tap also operatively connected to both ends of said output for grid bias and gain control of the push-pull limiter amplifier.

5. Apparatus in accordance with claim 4 wherein said means connecting said cathodes of said diode includes a delayed bias resistance, said cathodes further connected to said positive voltage supply through a bleeder resistance, whereby rise of said negative bias potential is delayed until the level of said incoming signal rises above the delayed bias resistance potential.

6. In a communications amplifier system, the combination of a sending amplifier adapted to have originating signals from a microphone passed therethrough, first and second transformers connected back-to-back, the primary winding of said first transformer connected across the output of said sending amplifier, the back-to-back secondary windings adapted to be connected across a signal transmission line, a limiter amplifier acting as a receiving amplifier and having its input connected across the primary winding of said second transformer, and an output amplifier adapted to feed a reproducing device and having its input connected to the output of said limiter amplifier, whereby signals from said sending amplifier and from said line are limited to a predetermined maximum by said limiter amplifier.

References Cited in the file of this patent

UNITED STATES PATENTS

| | | |
|---|---|---|
| 2,225,196 | Miessner | Dec. 17, 1940 |
| 2,244,695 | Hathaway | June 10, 1941 |
| 2,250,596 | Mountjoy | July 29, 1941 |
| 2,329,558 | Scherbatskoy | Sept. 14, 1943 |
| 2,509,077 | Schock | May 23, 1950 |
| 2,517,629 | Buys et al. | Aug. 8, 1950 |
| 2,525,103 | Sprecher | Oct. 10, 1950 |
| 2,530,075 | Peterson | Nov. 14, 1950 |
| 2,539,774 | Gluyas | Jan. 30, 1951 |
| 2,556,692 | Holdaway | June 12, 1951 |
| 2,681,989 | Cunniff | June 22, 1954 |

FOREIGN PATENTS

| | | |
|---|---|---|
| 902,415 | France | Dec. 4, 1944 |